(12) United States Patent
Ali et al.

(10) Patent No.: US 7,981,173 B2
(45) Date of Patent: Jul. 19, 2011

(54) PROCESS OF MAKING A LAMINATE AND LAMINATE FORMED THEREBY

(75) Inventors: Terry Ali, Fairborn, OH (US);
Christopher Ali, Beavercreek, OH (US);
Frank F. Ali, Xenia, OH (US)

(73) Assignee: Ali Industries, Inc., Fairborn, OH (US)

( * ) Notice: Subject to any disclaimer, the term of this patent is extended or adjusted under 35 U.S.C. 154(b) by 265 days.

(21) Appl. No.: 12/110,477

(22) Filed: Apr. 28, 2008

(65) Prior Publication Data

US 2009/0266001 A1     Oct. 29, 2009

(51) Int. Cl.
*B24D 11/00*   (2006.01)
*B24D 3/02*    (2006.01)
*B24D 18/00*   (2006.01)
*B24D 15/00*   (2006.01)

(52) U.S. Cl. ............... 51/297; 51/307; 51/308; 51/309; 451/534; 428/414; 428/422.8

(58) Field of Classification Search .............. 51/297, 51/307, 308, 309; 451/534; 428/414, 422.8
See application file for complete search history.

(56) References Cited

U.S. PATENT DOCUMENTS

| | | | |
|---|---|---|---|
| 3,202,567 A | 8/1965 | Murl | |
| 3,980,511 A | 9/1976 | Proucelle | |
| 4,121,958 A | 10/1978 | Koonts | |
| 4,966,609 A | 10/1990 | Callinan | |
| 5,863,369 A | 1/1999 | Clarke | |
| 6,077,601 A | 6/2000 | DeVoe | |
| 6,180,211 B1 | 1/2001 | Held | |
| 6,613,113 B2 | 9/2003 | Minick et al. | |
| 2003/0121212 A1 | 7/2003 | Minick | |
| 2006/0234899 A1* | 10/2006 | Nekmard et al. | 510/439 |
| 2007/0212985 A1 | 9/2007 | Boler | |
| 2007/0243802 A1 | 10/2007 | Petersen et al. | |

OTHER PUBLICATIONS

Kumasaka et al., English abstract of JP361125816A, Jun. 13, 1986*
Kyonaka et al., English abstract of JP 04007108, Jan. 10, 1992.*

* cited by examiner

*Primary Examiner* — Elizabeth D Wood
(74) *Attorney, Agent, or Firm* — R. William Graham

(57) ABSTRACT

A process of making a laminate and laminate formed thereby and a process of making an abrasive laminate and laminate formed thereby include providing a first moving sheet having a first side and a second side, applying active foaming material in a pre-mixed form to the first side, providing a second moving sheet having a first side and second side, the second sheet provided in a manner such that the first side of the second sheet contacts the foaming material to form an uncured laminate and maintaining the first sheet and the second sheet at a predetermined distance relative to one another during a curing period of the foaming material such that the foaming material bonds to the first sheet and the second sheet and upon curing forms a laminate.

6 Claims, 2 Drawing Sheets

PROCESS OF MAKING A LAMINATE AND LAMINATE FORMED THEREBY

BACKGROUND OF INVENTION

1. Field of Invention

This invention pertains to a process of making a laminate and laminate formed thereby. More particularly, the invention is directed to a process of making an abrasive laminate and laminate formed thereby.

2. Related Art

Various abrasive sanding blocks structures exist in the field of sanding. Typically, these structures come in two forms, one in which conventional sandpaper is connected to a support block or device or another in which a sponge material is spray coated with abrasive grit.

Sponges have met with some success in that users find them easy to work with and hold. However, sponges have poor surfaces to which abrasive grits can be applied. U.S. Pat. No. 4,966,609 discloses a flexible abrasive article for cleaning, polishing or smoothing which includes foam with grit adhesively bonded to the foam.

Sandpaper remains a more desirable product from a durability and performance standpoint, but they are not as user friendly. A few attempts have been made to marry the technologies. For example, U.S. patent application Ser. No. 11/404,451 shows a laminated abrasive article. The laminate shows an abrasive sheet glued to a backing sheet having continuous closed cell foam. U.S. patent application Ser. No. 11/683,064 shows a wet sanding sponge which includes a sponge having sandpaper sewn thereon.

Still other sanders have employed other ways to hold the sandpaper on a sander. These sanders typically employ wire clips or other clamping mechanisms to retain the sandpaper. Other sanders use hook and loop technology between a support structure and sandpaper. For example, the art has glued one hook/loop member to a rigid support structure and another hook/loop member to the sandpaper. These hook/loop members typically fail at the connection to the rigid support surface rendering the device useless.

Despite the improvements in the field, there is a continuous need to improve the sandpaper holding techniques, reduce costs on such sanders to ease the sanding process. There remains a need to improve composite support structure for use in sanding. The present invention solves many of the problems associated with such sander making technology and hand sanders currently existing in the marketplace. Accordingly, the present invention improves upon the art.

BRIEF SUMMARY OF THE INVENTION

It is an object to improve the method of making a laminate.

It is another object to improve products by forming the same from a laminate.

Another object is to improve abrasive articles.

It is another object of the invention to provide an improved composite structure for use in sanding.

It is a further object of the invention to provide a durable composite structure for use in sanding.

Yet another object is to provide a multifaceted composite tool.

Accordingly, the present invention is directed to a process of making an abrasive laminate, which includes the steps of:
(a) providing a first abrasive sheet having a first side and a second side, the second side coated with abrasive particles;
(b) applying an active foaming material in a pre-mixed form to the first side;
(c) providing a second sheet in a manner to contact the active foaming material to form an uncured laminate; and
(d) maintaining the first sheet and the second sheet at a predetermined distance relative to one another during a curing period of the foaming material such that the foaming material bonds to the first sheet and the second sheet and upon curing forms a laminate. The laminate can be cut to form an abrasive hand held tool. The first sheet and the second sheet are each provided as part of a first and second moving web. Retainers can be used to for forcibly maintain the sheets of the uncured laminate in fixed opposing relation.

Another embodiment of the process of making a laminate includes the steps of:
(a) providing a first sheet having a first side and a second side, the first sheet further characterized as part of a first moving web;
(b) applying active foaming material in a pre-mixed form to the first side of the first sheet;
(c) providing a second sheet having a first side and second side, the second sheet further characterized as part of a second moving web, the second sheet provided in a manner such that the first side of the second sheet contacts the active foaming material to form an uncured laminate; and
(d) maintaining the first sheet and the second sheet at a predetermined distance relative to one another during a curing period of the foaming material such that the foaming material bonds to the first sheet and the second sheet and upon curing forms a laminate. At least one of the second side of first sheet and the second side of the second sheet can include an abrasive material, a woven material or non-woven material.

A laminate is also provided by the steps of:
(e) providing a first sheet having a first side and a second side, the first sheet further characterized as part of a first moving web;
(f) applying active foaming material in a pre-mixed form to the first side of the first sheet;
(g) providing a second sheet having a first side and second side, the second sheet further characterized as part of a second moving web, the second sheet provided in a manner such that the first side of the second sheet contacts the active foaming material to form an uncured laminate; and
(h) maintaining the first sheet and the second sheet at a predetermined distance relative to one another during a curing period of the foaming material such that the foaming material bonds to the first sheet and the second sheet and upon curing forms a laminate.

The second side of first sheet or the second side of the second sheet includes an abrasive material, a woven material or non-woven material. The laminate is cut to form a hand tool, such as an abrasive tool.

Further objects will be evident from the following description of this invention.

BRIEF DESCRIPTION OF THE DRAWINGS

Figures 2, 3:
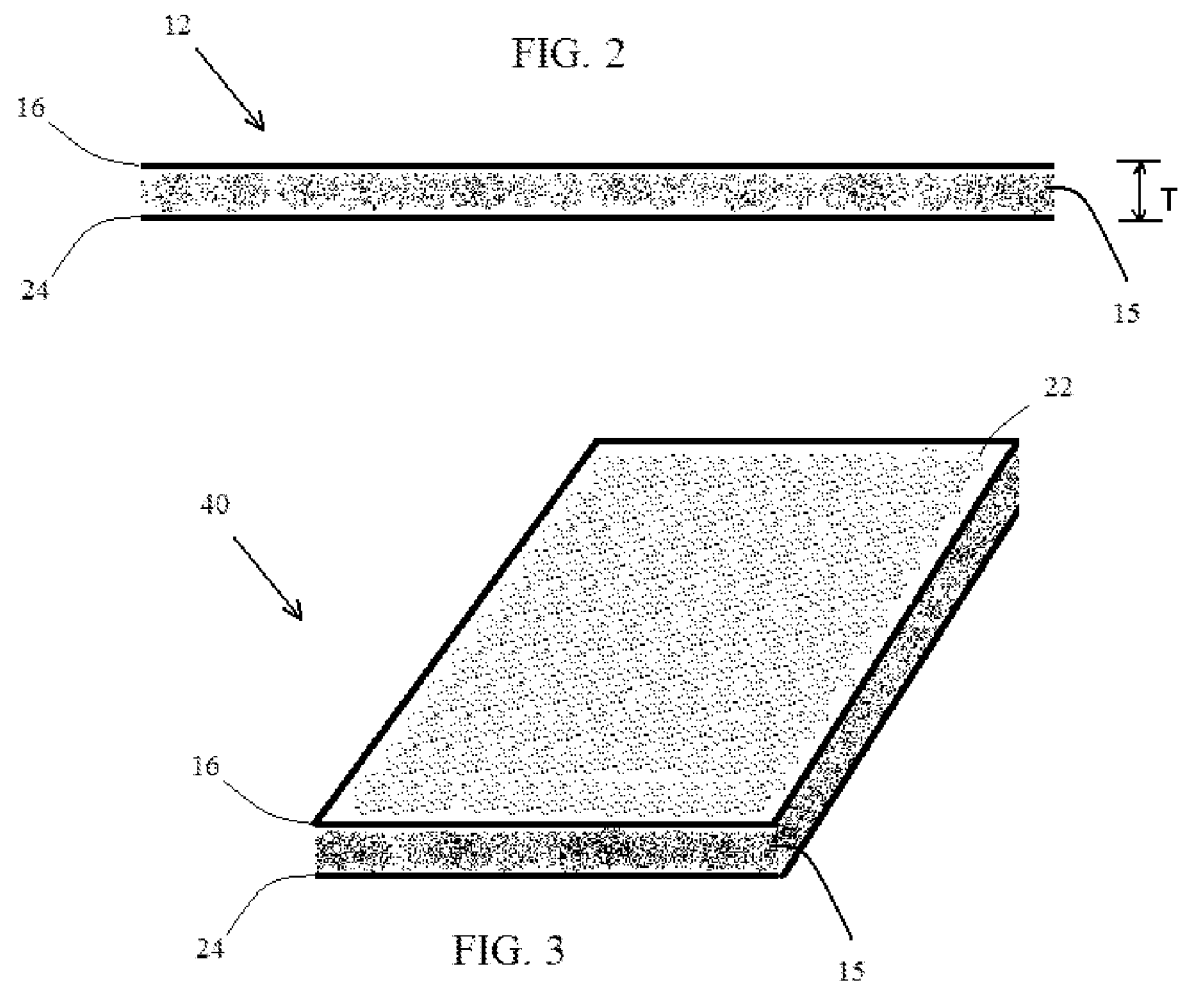

FIG. 2 is a sectional view of the laminate of this invention.

FIG. 3 is a perspective view of a laminated product of this invention.

DETAILED DESCRIPTION OF THE INVENTION

Figure 1:
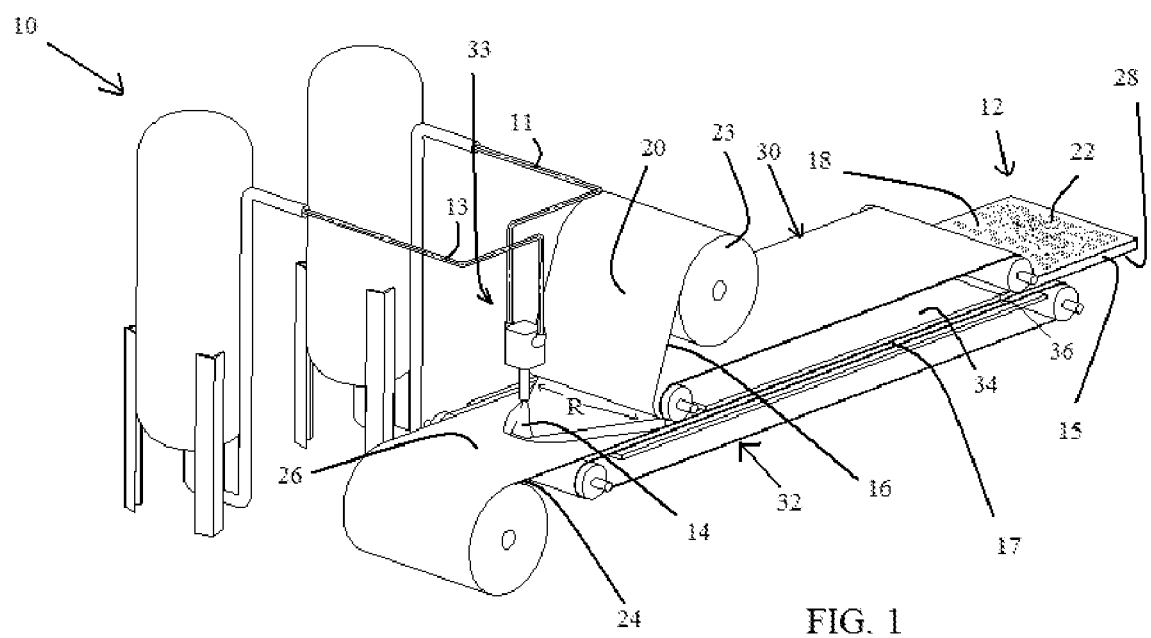
FIG. 1 is a schematic of the method of making the invention.

Referring now to the drawings of present invention, the laminating process is generally referred to by the numeral 10. The invention contemplates several variations to a continuous method of making the laminate 12.

The invention uses a foaming material 14 which can, for example, include polyol and isocyante, which actively foams and expands in its mixed uncured state to form an open cell foam core 15 when cured. The foaming material 14 can be applied to a substrate in the following manner providing a first abrasive sheet 16 having a first side 18 and a second side 20, the first side of which can be coated with abrasive particles 22. The abrasive sheet 16 can preferably be part of a web roll 23.

A second sheet 24 having a first side 26 and second side 28. The foaming material 14 is applied in an active foaming and uncured state to the first side 26 and contacts the side 20 to form an uncured laminate 17. The second side 28 can include abrasive coating.

The newly formed uncured laminate 17 is thereafter maintained in a constrained form such that the first sheet 16 and the second sheet 24 are at a predetermined distance relative to one another during a curing period of the foaming material 14 such that the foaming material bonds to the first sheet 16 and the second sheet 24 and upon curing forms the laminate 12. It is contemplated that the foaming material 14 components can be poured or sprayed onto the sheet 16. In the constrained rise process, the foaming material 14 which forms the core are poured onto the sheet 24 or in the metering roll process the sheet 24 can be coated from a bank of liquids in a metered continuous operation, commonly called the free rise process.

The foaming material 14 should be such as to provide comfortable flexibility. The second sheet 24 can have an abrasive coating, or a woven or non-woven covering The polyol and isocyanate are applied their liquid state to the sheets 16 and 24. A suitable temperature for curing the laminate is approximately 120 degree F., for example.

Here, the present invention uses opposing moving members 30 and 32 configured for forming the laminate 12. The sheet 16 is operatively disposed in a path of a feed mechanism 33 including one liquid component, e.g., isocyante, feed line 11 and another liquid component, e.g., polyol, by another feed line 13, with the understanding that the mechanism 33 can also include components of a pump, return lines, exchanger and nucleator which are common to use in the art. The opposing members 30 and 32 provide opposing surfaces 34 and 36, respectively, which collectively form a fixed thickness T. The members 30 and 32 can include a rigid moving belt or a plurality of roller bearings which permit the laminate to move thereby in a constrained thickness while the foaming material 14 cures. While a moving belt or roller bearings are contemplated, other suitable restraining elements may be used so long as they do not substantially affect the abrasive finish of the sheet 16. In this regard, the moving members 30 and 32 are configured to substantially preserve a new finish of the abrasive grit to the sheet 16 and other surface of sheet 24.

As the sheet 24 passes a delivery head for the foaming material 14, the two reactive liquid components are applied to the side 26 and expands to contact the side 20 in a manner in which the two components expand to fill a region R which forms the thickness T of the polyfoam layer 15. Upon a completed reaction between the components, the polyfoam layer 15 is formed which is bonded to the sheets 16 and 24. While the thickness T is constrained, the foaming material 14 is unrestricted in its expansion widthwise and according as it expands moves outward to cover the side 20 and 26 of sheets 16 and 24, respectively. In this manner, it is envisioned that the edges of the forming laminate 17 may not include the foaming material 14 as the expansion of the foaming material 14 will be controlled widthwise other than by the amount of liquid components initially delivered so as to not expand completely to the edge of the forming uncured laminate 17. In a preferred embodiment, the liquids include a polyol and an isocyante which can be metered, blended together, and injected onto the sheet 16 at low pressure to form the polyurethane structural foam. Typically, the foaming material 14 results in an exposed outer dense durable skin and an inner unexposed less dense core. The percentage of liquid components determines the amount of rigidity to the polyfoam layer 15. Subsequent the reaction and when curing is complete, the edges of the laminate 17 can be trimmed or cut sufficiently such that the laminate 12 has a uniform polyfoam layer 15 thickness. Preferably, individual composite sander 40 can be formed by a press cutting operation thus providing sander 40 with uniform thickness.

The sander 40 shown is exemplary of that contemplated by the inventors and it is contemplated that there can be a design changes to facilitate a particular use of the implement, such changes in shape. By so providing, the instant invention enables the manufacture of an improved laminate 12 and sander 40 which offer desirable qualities in ease of use and durability than previously available.

The above described embodiments are set forth by way of example and are not for the purpose of limiting the present invention. It will be readily apparent to those skilled in the art that obvious modifications, derivations and variations can be made to the embodiments without departing from the scope of the invention. Accordingly, the claims appended hereto should be read in their full scope including any such modifications, derivations and variations.

What is claimed is:

1. A process of making an abrasive laminate, which includes the steps of:
    (a) providing a first flexible abrasive sheet having a first side and a second side, said second side coated with abrasive particles;
    (b) applying active foaming material in a pre-mixed form to said first side;
    (c) providing a second flexible sheet in a manner to contact said active foaming material to form an uncured laminate; and
    (d) forcibly maintaining said first sheet and said second sheet at a predetermined spaced parallel distance relative to one another, wherein said sheets are not in contact with another and form only a partially confined predetermined fillable region during a curing period to form a predetermined thickness of said foaming material such that said foaming material bonds to said first sheet and said second sheet and by virtue of said forcibly maintained sheets, wherein said foaming material expands outward therebetween toward an unconfined area and upon curing forms a laminate.

2. The process of claim 1, which further includes the step of cutting said laminate to form an abrasive hand held tool.

3. The process of claim 1, wherein said active foaming material includes polyol and an isocyante.

4. The process of claim 1, wherein said first sheet and said second sheet are each provided as part of a first and second moving web.

5. The process of claim 4, which further includes the step of cutting said laminate to form an abrasive hand held tool.

6. The process of claim 3, which further includes the step of cutting said laminate to form an abrasive hand held tool.

* * * * *